United States Patent [19]

Wilde et al.

[11] 4,343,754
[45] Aug. 10, 1982

[54] PROCESS AND APPARATUS FOR MOLDING LINERS IN CONTAINER CLOSURES

[75] Inventors: Sheldon L. Wilde; Thomas J. McCandless, both of Crawfordsville; Robert M. Saunders, Ladoga, all of Ind.

[73] Assignee: H-C Industries, Inc., Crawfordsville, Ind.

[21] Appl. No.: 77,584

[22] Filed: Sep. 21, 1979

[51] Int. Cl.$^3$ .......................... B29D 9/08; B29D 7/16
[52] U.S. Cl. .................................... 264/154; 264/230; 264/250; 264/266; 264/268; 264/291; 425/110; 425/112; 425/127; 425/291; 425/809
[58] Field of Search ............... 264/230, 267, 268, 269, 264/274, 250, 266, 154; 425/809, 110, 112, 127, 291; 215/343, 344, 350

[56] References Cited

U.S. PATENT DOCUMENTS

| 2,068,389 | 1/1937 | Smith | 215/360 |
| 2,372,177 | 3/1945 | Conner | 428/36 |
| 2,823,422 | 2/1958 | Schneider | 264/268 |
| 2,840,858 | 7/1958 | Rainer et al. | 264/268 |
| 3,536,224 | 10/1970 | Green | 264/274 |
| 3,557,030 | 1/1971 | Simons | 264/268 |
| 3,828,963 | 8/1974 | Moller | 264/268 |
| 3,844,861 | 10/1974 | Irish, Jr. | 156/69 |
| 4,088,730 | 5/1978 | Wilde | 264/268 |
| 4,130,213 | 12/1978 | Wszolek | 264/268 |
| 4,140,451 | 2/1979 | Herdzina et al. | 264/268 |
| 4,156,490 | 5/1979 | Peraboni | 264/274 |

FOREIGN PATENT DOCUMENTS 1384370 2/1975 United Kingdom .

Primary Examiner—James B. Lowe
Attorney, Agent, or Firm—Dressler, Goldsmith, Shore, Sutker & Milnamow, Ltd.

[57] ABSTRACT

A process for making a composite closure having a plastic cap with specially configured pedestals that are interconnected to a plastic liner. In one embodiment, the pedestals are each formed with an overhang, such as a mushroom-shaped overhang, to provide a mechanical interlock with the liner. In other embodiments, the pedestals are each formed with a fusible heat concentration zone that is fused to the liner as the liner is compression molded and heated in the cap. In one embodiment, each of the fusible pedestals are formed with a cylindrical configuration. In another embodiment, each of the fusible pedestals are formed in the shape of a pyramid.

56 Claims, 21 Drawing Figures

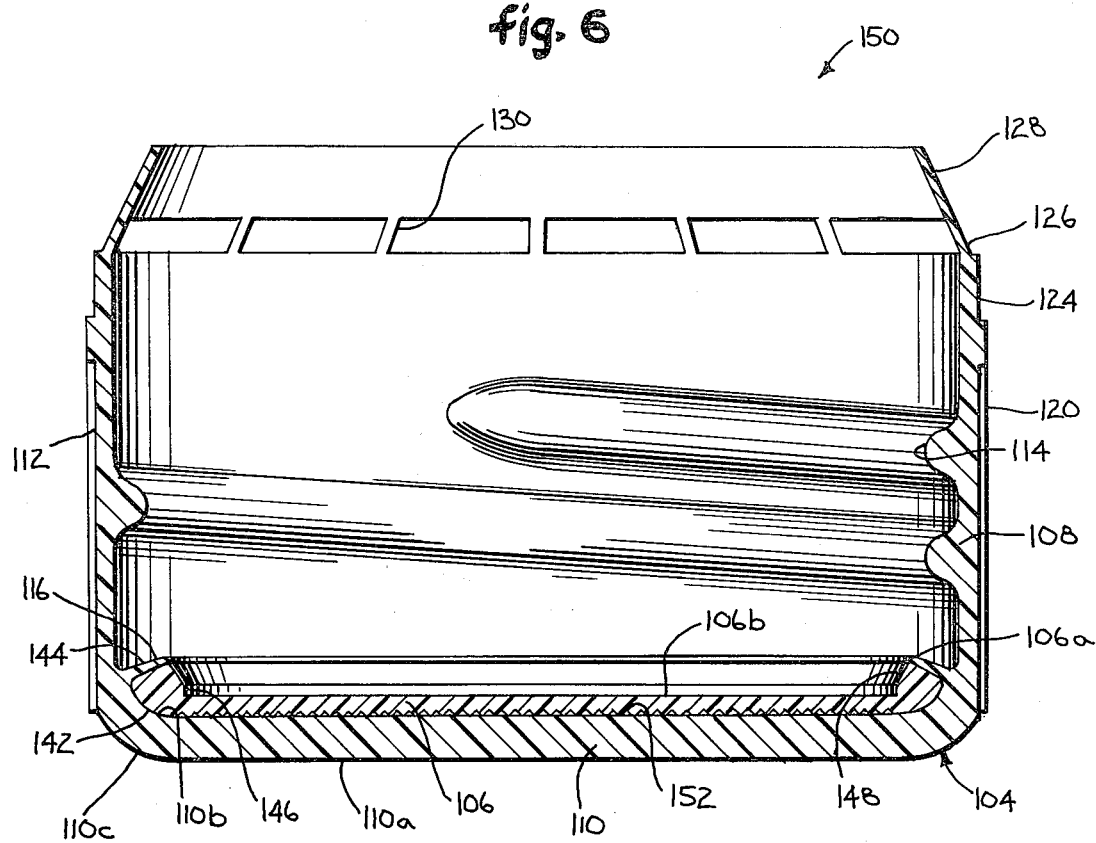
fig. 6
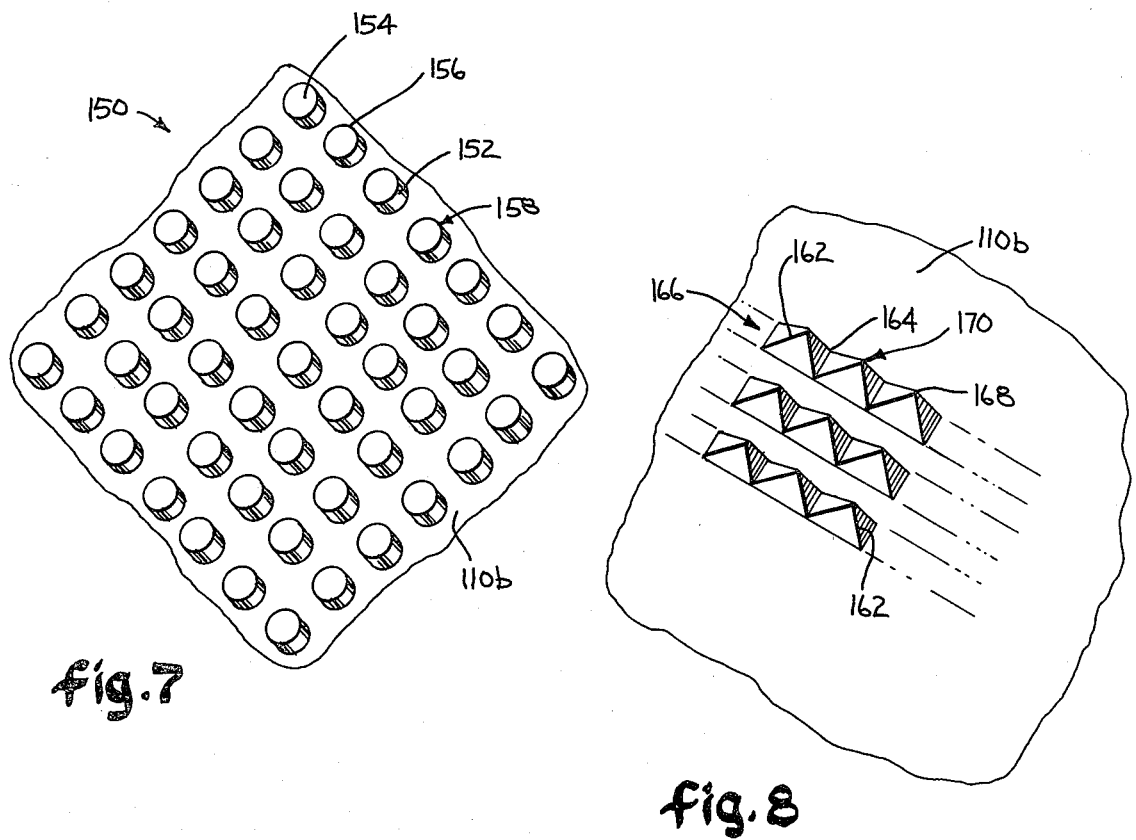
fig. 7
fig. 8

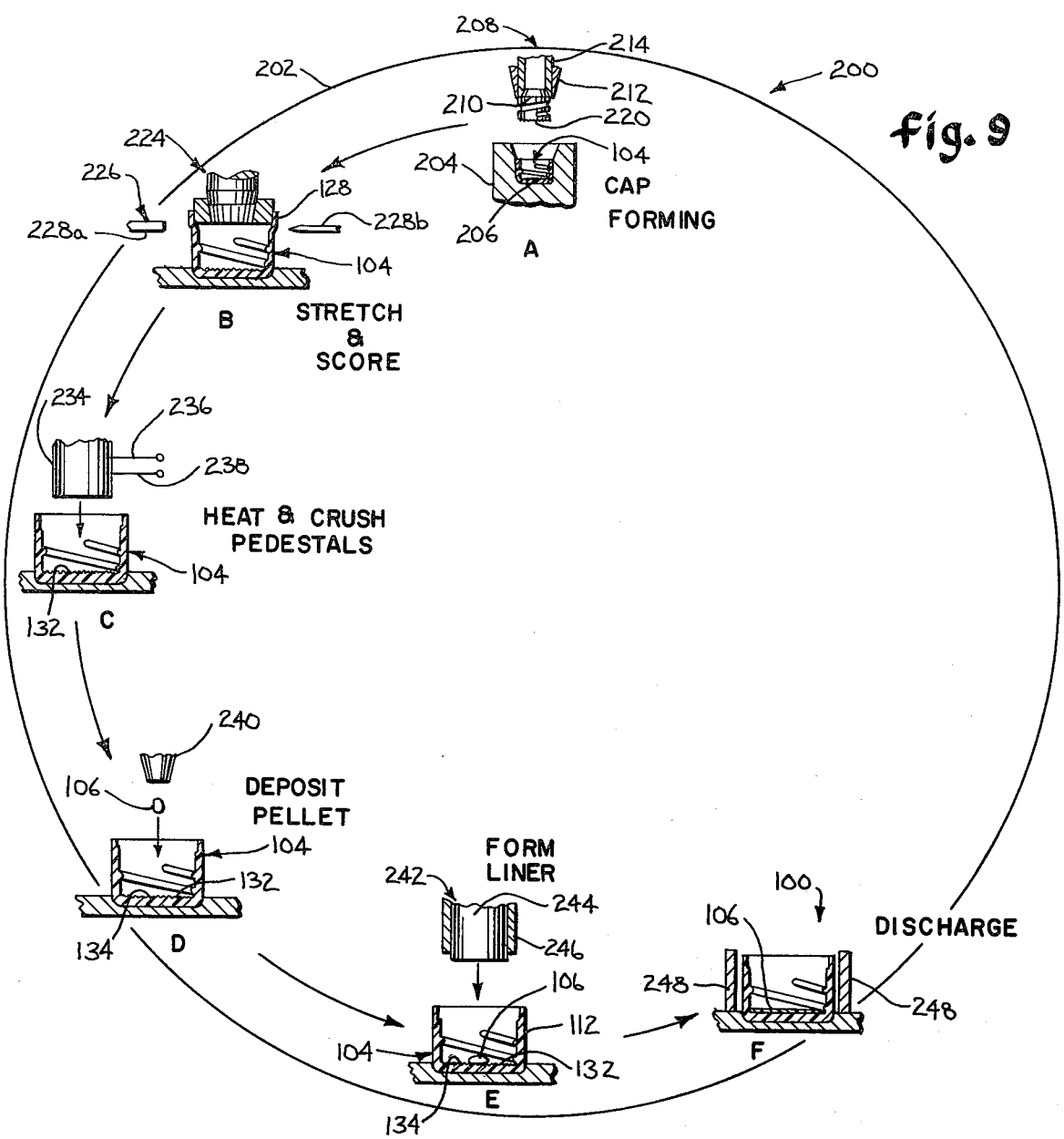
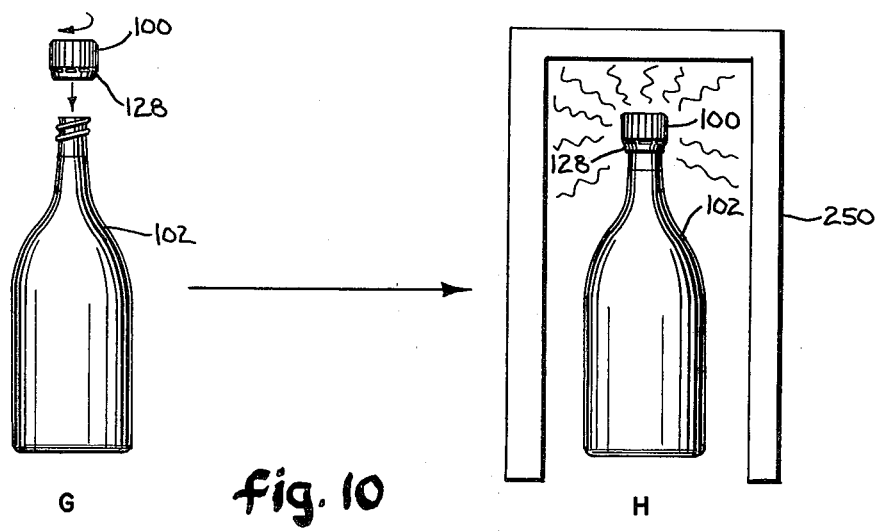

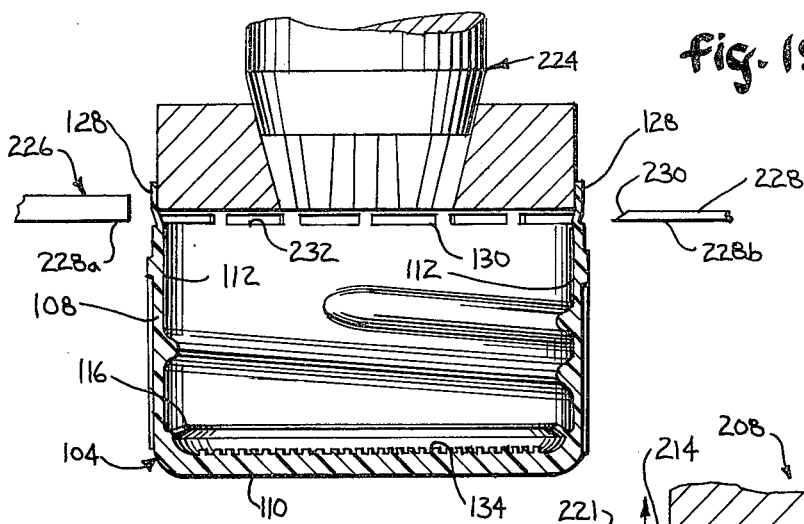
fig. 19
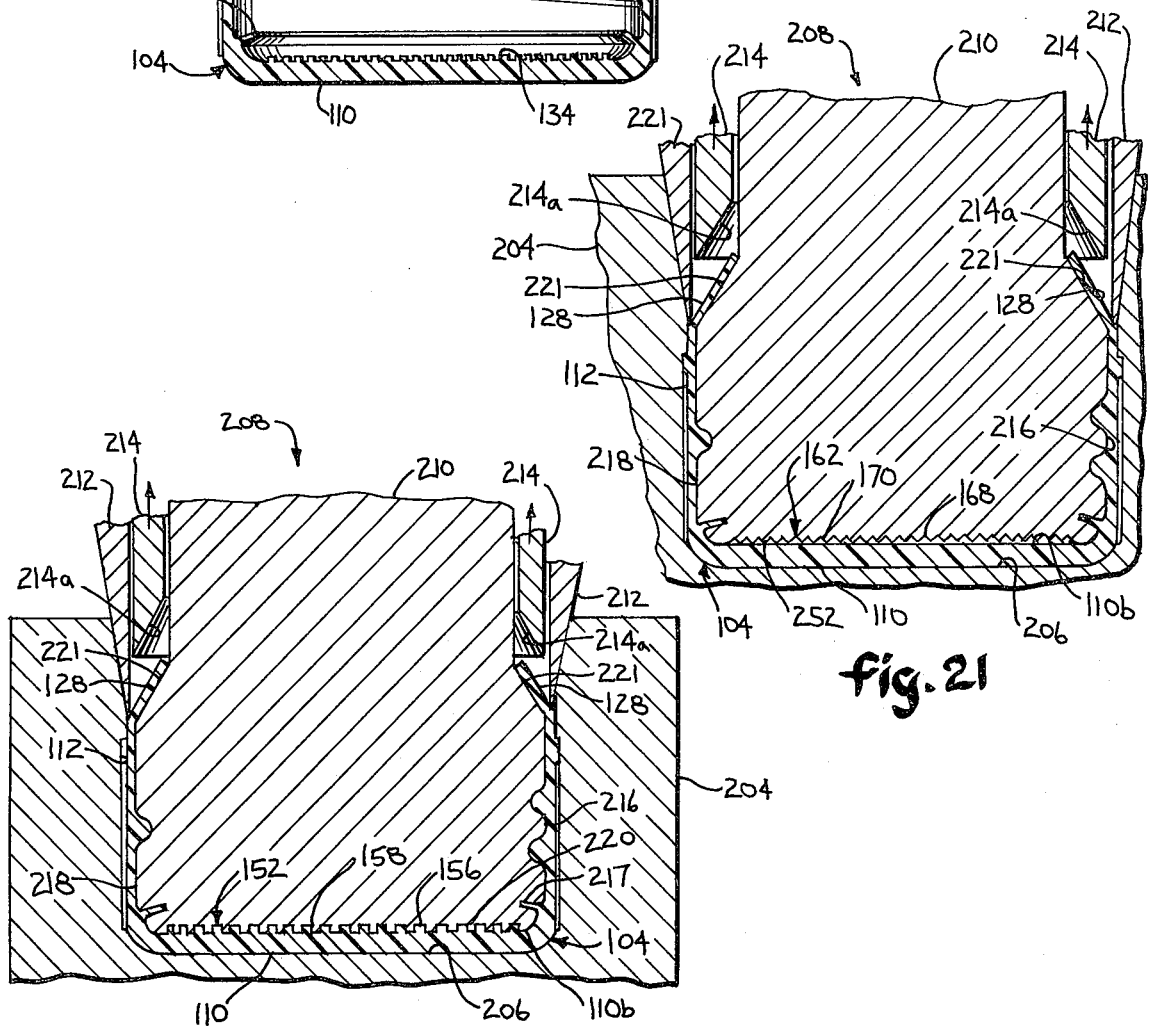
fig. 21
fig. 20

PROCESS AND APPARATUS FOR MOLDING LINERS IN CONTAINER CLOSURES

BACKGROUND OF THE INVENTION

This invention relates to closures, and more particularly, to a process for making a composite plastic closure for bottles.

Various machines and processes have been developed over the years for lining metal crowns. For example, the Nagy machine shown in U.S. Pat. Nos. 1,931,294 and 2,069,987, and the Johnson machine shown in U.S. Pat. No. 1,852,578, were developed for lining metal crowns with cork liners. The process and machines shown in U.S. Pat. Nos. 1,486,937, 2,516,647, 2,548,305, 2,688,776, 2,719,564, 2,745,135, 2,877,493, 2,952,035 and 2,952,036, were developed for lining metal crowns with rubber liners. Subsequently, the Wilkens, Simpson and Aichele machines, and similar machines, shown in U.S. Pat. Nos. 2,684,774, 2,696,318, 2,840,858, 2,851,727, 2,881,475, 2,930,081, 2,954,585, 2,963,738, 3,029,765, 3,135,019, 3,577,595, 3,674,393, 3,827,843 and 3,877,497, were developed for lining metal crowns with thermosetting plastic or with thermoplastic. The above machines and processes have met with varying degrees of success.

Recently, the advantages of plastic crowns and closures have been recognized. The physical characteristics and nature of plastics, however, such as their melting and plastic deformation temperatures, and their resiliency, impact and compression strengths at molding and refrigeration temperatures present different structural problems in molding plastic closures than in forming metal closures.

In prior art plastic closures, for example, the wall thickness is confined to a limited range, i.e., the wall must be thin enough to permit axial removal and deflection of the threaded skirt of the closure from the plunger, but thick enough to support the necessary thread height and profile. The threads of conventional plastic closures are also limited to a certain amount of taper to permit deflection and removal of the threaded skirt from the plunger.

In conventional plastic closures, such as polypropylene closures, the closures often have low impact strength and fail a drop test in the refrigeration range of 32-40 degrees F.

It is therefore desirable to provide an improved process for making a composite plastic closure which overcomes most, if not all of the above disadvantages.

SUMMARY OF THE INVENTION

An improved process is provided for making a composite closure for bottles and other containers in which a cap is formed with a top wall portion and a skirt. Novel liner-engaging pedestals extend from the top wall portion into an area bounded by the skirt and portions of the liner-engaging pedestals are spaced apart from each other to define liner-receiving passageways therebetween.

In order to seal the finish of the container, molten liner-forming material, such as EVA (ethylene vinyl acetate) or PVC (polyvinyl chloride) is deposited in the liner-receiving passageways of the cap and is subsequently mechanically or thermally interconnected, such as with a molding plunger, to the liner-engaging pedestals.

In one embodiment, the pedestals are each upset, such as by heating and crushing, to form an overhang that interlockingly engages the liner. In the preferred form, each of the pedestals are upset to form a mushroom-shaped overhang.

In other embodiments, the cap is formed with fusible pedestals that have a heat-concentration zone for fusion with the liner. This construction and arrangement desirably allows the pedestals to be heated to their melting and plastic deformation temperature for fusion with the liner, while the remainder of the cap is kept cooler, at a temperature below its melting and plastic deformation temperature, so as to minimize distortion of the cap when the liner is formed.

In one embodiment, each of the pedestals are formed with a cylindrical configuration having a circular edge that defines at least part of the heat-concentration zone.

In another embodiment, each of the pedestals are formed with an apex that defines part of the heat concentration zone. Preferably, such pedestals are each formed in the shape of a pyramid.

In order to determine whether the seal between the closure and the container has been opened, the cap is formed with a pilfer band that is detachably connected to the skirt, and the pilfer band is heat shrunk about the neck of the container after the closure has been inserted on the container.

A more detailed explanation of the invention is provided in the following description and appended claims taken in conjunction with the accompanying drawings.

BRIEF DESCRIPTION OF THE DRAWINGS

FIG. 6 is an enlarged cross-sectional view of another composite plastic closure having fusible cylindrical pedestals made in accordance with the process of the present invention;

FIG. 7 is a greatly magnified perspective view of some of the fusible cylindrical pedestals of the composite closure of FIG. 6;

FIG. 8 is a greatly magnified perspective view of some of the fusible pyramid-shaped pedestals of another composite plastic closure made in accordance with the process of the present invention;

FIG. 9 is a schematic flow diagram of the process of the present invention;

FIG. 10 is a schematic flow diagram of subsequent steps that can be performed in a bottling plant;

FIG. 19 is an enlarged cross-sectional view of the stretching and scoring devices at station B of FIG. 9;

FIG. 20 is an enlarged cross-sectional view of a cap-forming plunger assembly for making a composite plastic closure with fusible cylindrical pedestals; and FIG. 21 is an enlarged cross-sectional view of a cap-forming plunger assembly for making a composite plastic closure with fusible pyramid-shaped pedestals.

DETAILED DESCRIPTION OF THE ILLUSTRATIVE EMBODIMENT

Figure 1:
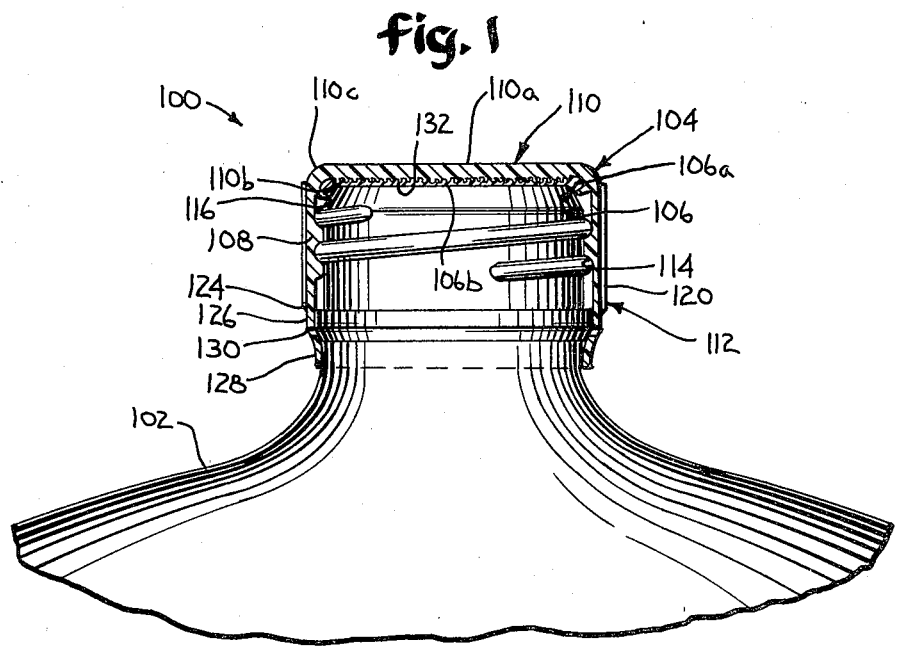
FIG. 1 is a cross-sectional view of a composite plastic closure made in accordance with the process of the present invention, that has been screwed onto a container to provide a fluid tight seal with its finish.
Figure 11:
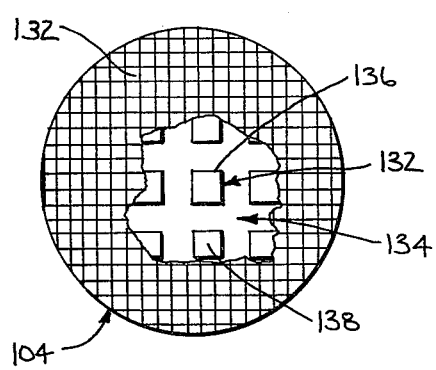
FIG. 11 is a bottom plan view of the underside of the cap after it has been formed at station A of FIG. 9 with greatly magnified portions broken away for ease of clarity and understanding.
Figure 12:
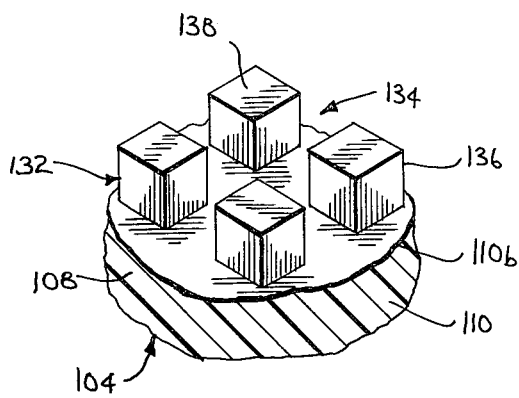
FIG. 12 is a greatly enlarged perspective view of some of the pedestals of FIG. 11, with portions of the cap's top wall shown in cross-section.
Figure 13:
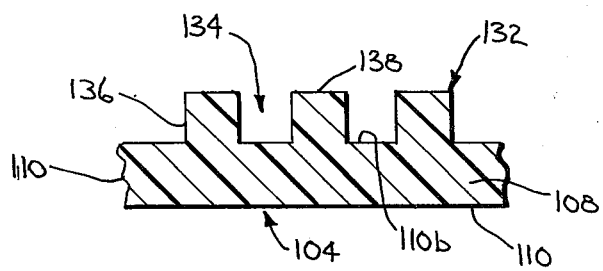
FIG. 13 is a cross-sectional view of some of the pedestals of FIG. 11.
Figure 14:
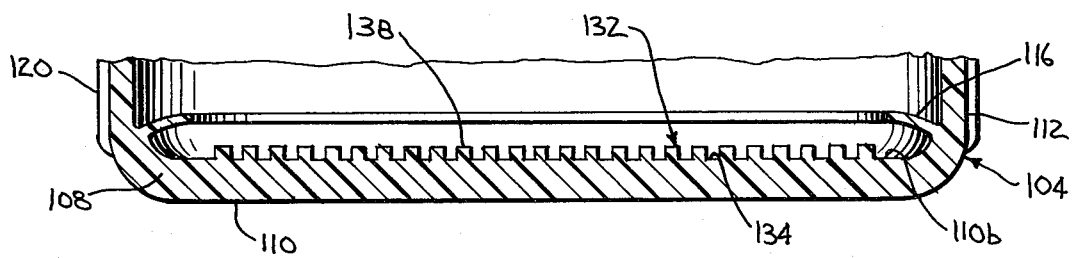
FIG. 14 is a fragmentary cross-sectional view of portions of the cap after the cap has been formed at station A of FIG. 9.
Figure 15:
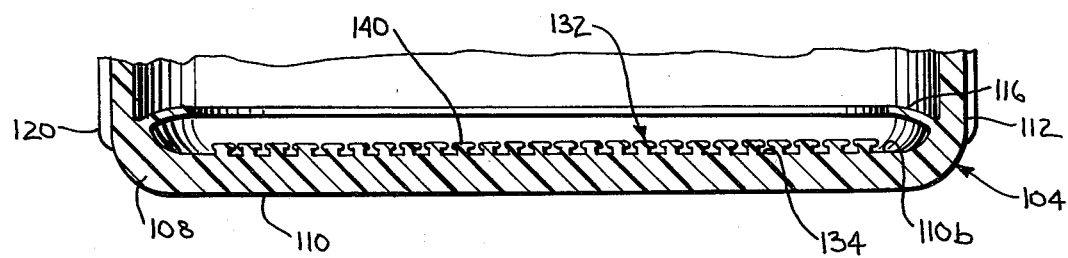
FIG. 15 is a fragmentary cross-sectional view of portions of the cap after the pedestals have been upset at station C of FIG. 9.

Referring to FIG. 1 of the drawings, a composite plastic closure 100 is provided to close and fluidly seal the finish of a threaded bottle 102 or other container filled with a liquid, such as a carbonated beverage. Composite closure has a resilient plastic cap 104, which is sometimes referred to as a shell or crown, and has a resilient fluid-impervious plastic liner or seal 106. Cap 104 is preferably made of moldable thermoplastic, such as polypropylene or polyethylene. Other materials can also be used. Liner 106 is preferably made of moldable thermoplastic, such as polyvinyl chloride (PVC). Other liner materials, such as ethylene vinyl acetate (EVA) can also be used.

Cap 104 has a top wall disc-shaped portion 110 or surface that is sometimes referred to as the "top" and has a depending internally threaded, annular skirt 112. Top 110 has a generally flat outer surface 110a and an inner surface that provides an underside 110b. The circular edge or corner 110c formed by the intersection of the top and the skirt is rounded or chamfered. A heat-shrinkable detachable pilfer band or tamper-proof band 128 is connected to the skirt by frangible bridges 130. In the illustrative embodiment, the exterior surface of skirt 112 has circumferentially spaced vertical finger-gripping ribs 120 to facilitate gripping of the cap. The vertical ribs terminate in an outer rim 124 spaced below top 110. Rim 124 has an inwardly inclined annular shoulder 126 that provides the end of skirt 112.

In order to interlockingly engage and mechanically connect the liner 106 with the cap 104, the cap has a plurality of liner-engaging mushroom-shaped pedestals 132 that extend vertically from the underside 110b of cap-top 110. As shown in FIGS. 2-5, the liner-engaging pedestals 132 are spaced apart from each other in a grid-like array or matrix in longitudinal parallel rows and in lateral parallel rows to define a plurality of liner-receiving passageways, channels or spaces 134 therebetween to receive the liner-forming plastic 106. Liner-receiving passageways 134 and pedestals 132 are circumferentially bounded and surrounded by skirt 112 (FIG. 1).

Skirt 112 has an internal annular lip 116 (FIG. 1) that provides a retainer to retain and confine the annular bead portion 106a of liner 106 and serves to support and seal against a cylindrical sleeve during the liner-forming process.

Liner 106 has a centrally disposed disc-shaped portion or membrane 106b (FIG. 1) that extends across and is connected to and circumscribed by annular sealing bead 106a. Disc portion 106b engages the underside 110a of cap-top 110 and extends to a position beneath the mushroom-shaped heads or overhangs 140 (FIGS. 3-5) of liner-engaging pedestals 132 to completely cover and overlie pedestals 132. Annular bead 106a is confined in the channel between cap-top 110 and retainer 116. In the illustrative embodiment, the outer face of bead 106a has a rounded lower portion 142 (FIG. 6) that is shaped complementary to the internal rounded corner that connects the top 110 to skirt 112, and has an outer upper frusto-conical portion 144 that is inclined and converges radially inward away from top 110, and engages retainer 116. The inner face of bead 106a has a vertical lower portion or shoulder 146 and an upper frusto-conical sealing portion 148 that is inclined and diverges radially outward from shoulder 146. Upper sealing portion 148 resiliently seals and seats against the finish and rim of the bottle to abut against and fluidly seal any irregularities, such as bumps or unevenness, in the finish.

While the above composite closure 100 can be made in various ways, a preferred process for making the above composite closure is illustrated in the schematic flow diagram of FIG. 9. In the schematic flow diagram of FIG. 9, a cap-forming and lining machine 200 is schematically shown with a plunger drum 202, which is sometimes referred to as a molding turret, conveyor or sprocket wheel. Plunger drum 200 continuously and sequentially rotates and move caps 104 to stations A-F. While a single drum is shown, it is to be understood that the process of this invention could be performed by using a plurality of drums. Furthermore, in some circumstances it may be desirable to use a linear (straight-line) conveyor or other types of conveying devices to carry out part of or all of the steps of the subject invention.

At cap-forming station A (FIG. 9), the plastic cap 104 is formed to provide a top 110 (FIG. 14), an internally threaded skirt 112 with retainer 116 and a grid-like array of upright liner-engaging pedestals 132 that extend from the underside 110b of top 110 to a position below retainer 116. As shown in FIGS. 11-14, liner-engaging pedestals 132 are spaced apart from each other to define liner-receiving passageways or spaces 134 therebetween. In the embodiment of FIGS. 11-14, the pedestals 132 are formed with a body 136 having a generally square cross-section and a free end 138, that is spaced away from cap-top 110. Cap 104 is also formed at station A with an inwardly biased pilfer-band 128 (FIG. 16) that extends from the bottom end of skirt 112.

Figure 16:
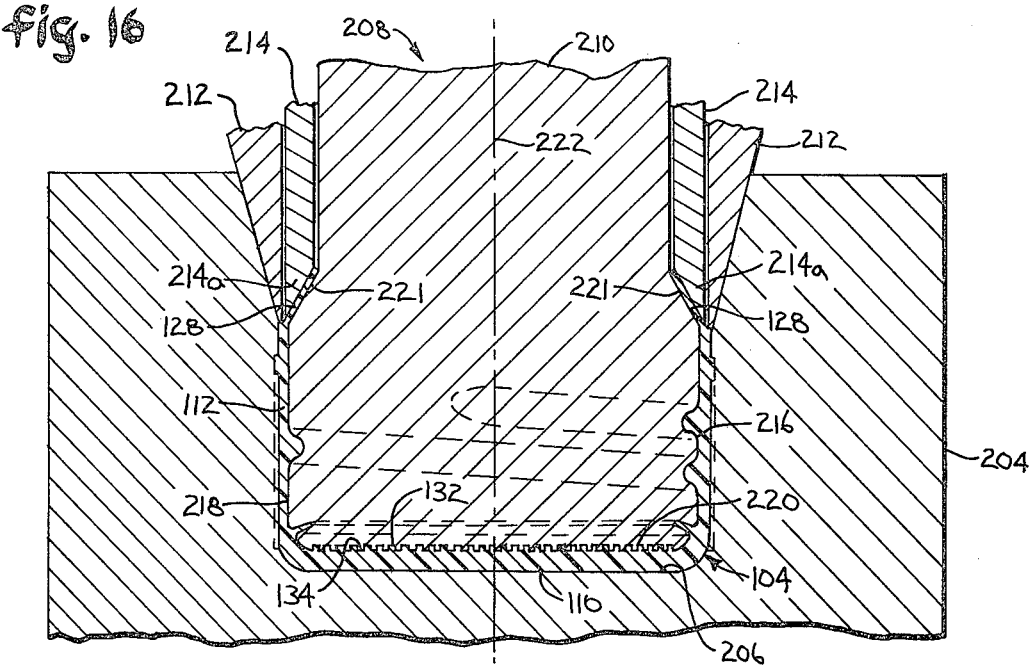
FIG. 16 is an enlarged cross-sectional view of the cap-forming plunger assembly and cap at station A of FIG. 9, with the intermediate sleeve of the plunger assembly moving upwards and the stripper sleeve of the plunger assembly moving downwards.

As shown in FIGS. 9 and 16, in order to mold crown 104 at station A, a rotatable female die 204 is provided with a cap-shaped cavity 206 therein, and a cam actuated, multi-piece, cap-forming plunger assembly 208 is operatively positioned above die 204. Plunger assembly 208 moves downwardly into die-cavity 206 after cavity 206 is provided with a cap-forming molten, moldable thermoplastic, such as polypropylene or polyethylene, to compress the plastic-filled cavity 206 for a sufficient amount of time to permit the cap-forming plastic to solidify and set. Female die 204 and male plunger assembly 208, therefore, cooperate together to provide a mold, that compression molds and forms the cap 104. While the cap-forming plunger 210 is preferably moved into die-cavity 206 to compress the cap-forming plastic, it is to be understood that the same results could be accomplished by raising the die into molding engagement with the plunger.

Figure 18:
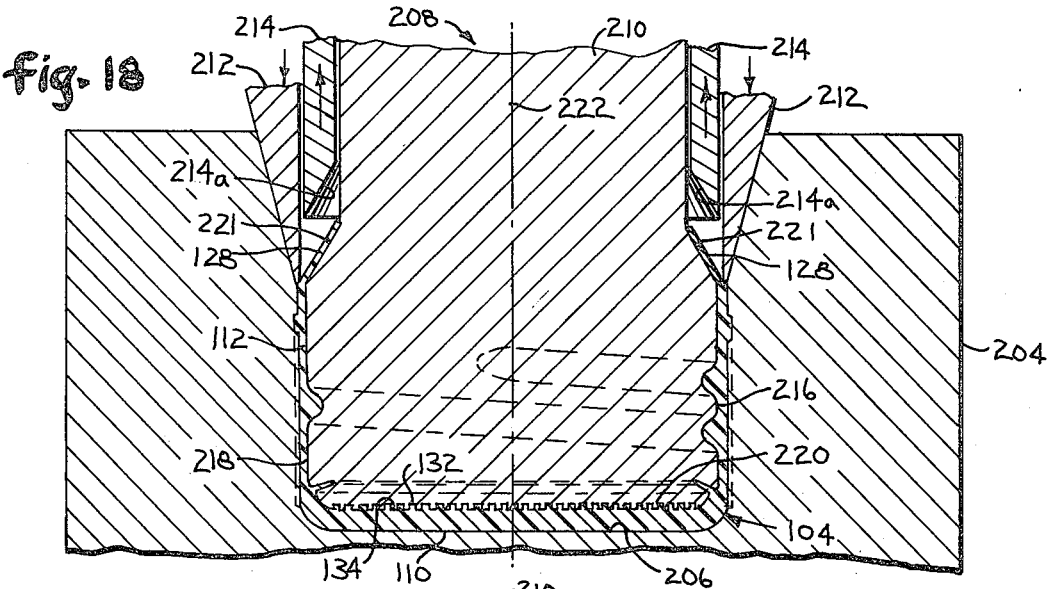
FIG. 18 is a view similar to FIG. 16, but with the intermediate sleeve withdrawn.

As shown in FIGS. 16 and 18, multi-piece plunger assembly 208 has a cap and pedestal-forming plunger 210, an outer frusto-conical sealing ring or stripper sleeve 212, and an intermediate sleeve 214 that is positioned between plunger 210 and outer ring 212. Plunger 210, outer ring 212 and intermediate sleeve 214 can each move independently of each other as explained below. Cap-forming plunger 210 has external threads 216, a retainer and a pedestal-forming plunger-head 218. A stainless steel screen 220, such as a 50 mesh screen, is secured to the face of the plunger 210 in order to mold the liner-engaging pedestals 132 with a square cross-section. In some circumstances, it may be desirable to drill holes into the face of plunger 210 instead of using a screen.

When beveled or inclined pilfer-band forming edge 214a of intermediate sleeve 214 of the plunger assembly 208 moves to its bottommost position as shown in FIG. 16, closely adjacent frusto-conical pilfer band-forming plunger portion 221, it forms the plastic therebetween into a frusto-conical shaped pilfer band 128, that is inclined and converges away from cap-top 110. Pilfer band 128 (FIG. 16) has a minimum inside diameter less than the inside diameter of cap-skipt 112. This biases and urges the pilfer band 128 radially inward.

As shown in FIG. 18, after the cap 104 is spun as explained below, the pilfer-band forming edge 214a of intermediate sleeve 214 is withdrawn from the pilfer band-forming plunger portion 221 while the outer ring 212 moves downwardly to strip cap 104 from plunger 210 so that pilfer band 128 stretches to a vertical position (cylindrical configuration) as it moves over plunger head 218. After cap 104 is stripped from plunger 210, pilfer band 128 returns to its inwardly biased frusto-conical position.

Figure 17:
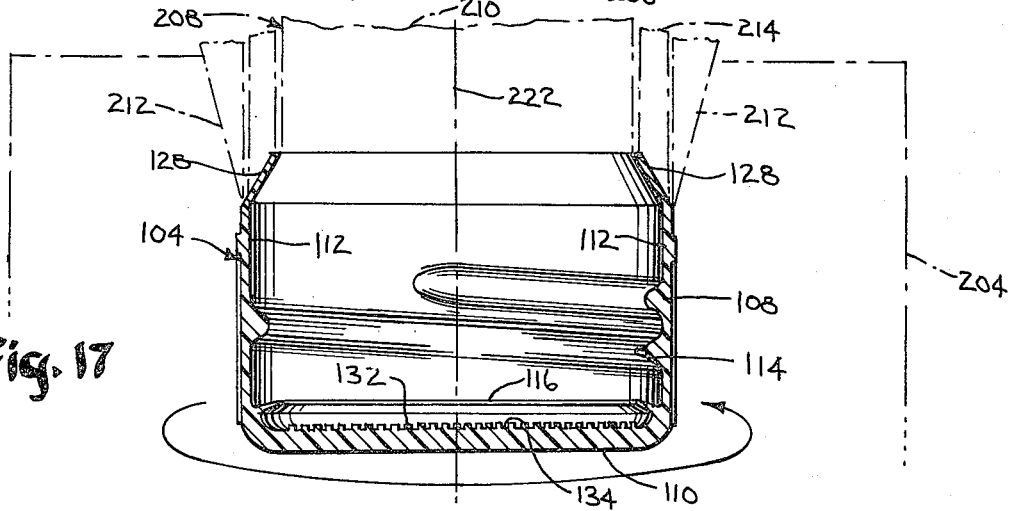
FIG. 17 is a cross-sectional view of the crown as it is spun in the position shown in FIG. 16 with the cap-forming plunger assembly and die depicted in phantom or dotted line.

In order to increase the strength of the cap 104, the cap is rotated or spun about its vertical (upright) axis 222 as shown in FIG. 17 as the cap-forming plunger 210 fully enters the die-cavity 206 before the cap-forming plastic 108 had solidified. While spinning begins before plunger 210 has reached its bottommost position, the bulk of the spinning occurs after the plunger has bottomed out. This rotation imparts a spiral orientation or helical array in the plastic 108 that gives it a greater hoop strength and crack resistance than if it were molded without rotation. Such spinning does not substantially disturb the exterior shape of the pedestals 132 and threads 114 that have been compression molded. In the preferred method, one of the parts of the mold, such as the female die 204, is rotated to attain spiral orientation of the plastic molecules 108. It may be desirable, however, in some circumstances that the plunger 210 rotate in lieu of die 204, or that plunger 210 rotate in unison with die 204. Polypropylene caps made by this spinning process had relatively good impact resistance at low temperatures and were found to pass a drop test in the temperature ranges from about 32 to about 40 degrees F.

After the cap 104 has been spun in one direction and molded, stripper sleeve 212 strips or "pops off" cap 104 from plunger 210. While the "pop off" method of removal is preferred, the cap 104 can also be removed by rotating or spinning the cap in the opposite direction and simultaneously moving the cap away from plunger 210 to unthread skirt 112 from plunger 210. This can be accomplished by removing the load (releasing the pressure) of the plunger 210 and rotating the female die 204 in the opposite direction to the above spinning direction, while withdrawing (lowering) the die from plunger 210, and concurrently stripping cap 104 from plunger 210 with stripper sleeve 212. Alternately, unthreading of the crown 104 from the plunger 210 can be accomplished by rotating and raising the plunger 210 in an unscrewing direction.

Cap 104 is then moved to station B (FIG. 9). At station B pilfer band 128 is stretched and scored to form frangible bridges 130 (FIG. 19) that detachably connect pilfer band 128 to skirt 112. Stretched and scored pilfer band 128 has a memory to retract and shrink inwardly to its original frusto-conical position (FIG. 16) when heated.

In order to stretch and score pilfer band 128 at station B, there is provided a frusto-conical stretcher 224 (FIG. 19) or expanding chuck, and a scoring device 216. In the embodiment illustrated in FIG. 19, scoring device 226 is in the form of cutting knives 228 with shearing edges 230.

Stretcher 224 (FIG. 19) stretches, lifts and expands pilfer band 128 to a cylindrical (vertical) position. In the preferred embodiment, stretcher 224 is heated to about 200 degrees F. to facilitate stretching. Preferably, pilfer band 128 is overstretched circumferentially about ten percent to have a heated and stretched inside diameter slightly greater than the minimum inside diameter of skirt 122, so that when pilfer band 128 contracts upon being cooled by ambient air, it will recover to a cylindrical container-inserting inside diameter about equal to the inside diameter of skirt 112.

While pilfer band 128 is being stretched by stretcher 234, it is scored by knives 228 of scoring device 226 (FIG. 19) to form the frangible bridges 130 that detachably connect pilfer band 128 to skirt 112. Knives 228 include a bridge-forming vertical knife 228a and a horizontal scoring knife 228b. Bridge-forming vertical knife 228a cuts vertical openings or notches in pilfer band 128 to form frangible connecting bridges 130. Horizontal scoring knife 228b horizontally scores all the bridges 130. Desirably, some of the bridges 130 are thicker than others, so that when cap 104 is removed from its bottle, pilfer band 128 will tear into one or more pieces and still be attached to cap 104 by thicker bridges 130. In some circumstances it may be desirable to have all bridges 130 of the same thickness by using only horizontal scoring knife 228b so that pilfer band 128 will remain entirely on its bottle when cap 104 is removed.

At station C, mushroom forming plungers 234, sometimes preferred to as overhang-forming plunger 234, is heated by heating wires 236 and 238 to about 325 degrees F. for about 3 or 4 seconds, to upset the free ends 138 of lining-engaging pedestals 132 (FIGS. 12–14) to form mushroom-shaped heads or overhangs 140 (FIGS. 2–5 and 15) that interlockingly engage the liner-forming plastic 106 (FIG. 5) that is subsequently deposited into cap 104 at station D. Each mushroom-shaped overhang 140 of each pedestal 132 extends transversely outward of its pedestal body 136.

The amount of upset or overhang of each pedestal 132 is proportional to the magnitude of pressure and temperature applied by overhang-forming plungers 234 to the free end 138 of pedestal 132. By varying the pressure and/or temperature, the diameter of the mushroom-shaped heads 140 can be selected to control the liner-holding strength, which is sometimes referred to as the peel strength or tear-out strength, of the liner-engaging pedestals 132. For example, the tear-out strength can be varied from about 2 to about 6 pounds. This is particularly desirable when it is desired to remove liner 106 from cap 104 at some later time. The maximum bond and holding strength between the pedestals 132 and liner 106 occurs when the overhangs 140 of the pedestals contact each other.

It will be appreciated that pedestals having overhangs or heads of other shapes to provide a mechanical interlock with the liner could also be made in accordance with the process of the subject invention.

Figure 2:
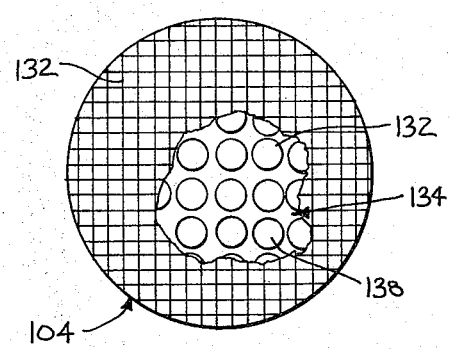
FIG. 2 is a bottom plan view of the underside of the cap of the composite closure after the pedestals have been upset to form mushroom-shaped overhangs, with greatly magnified portions broken away for ease of clarity and understanding.
Figure 3:
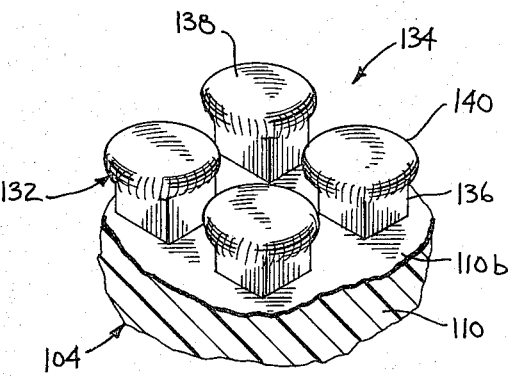
FIG. 3 is a greatly enlarged perspective view of some of the pedestals of FIG. 2, with portions of the cap's top wall shown in cross-section.
Figure 4:
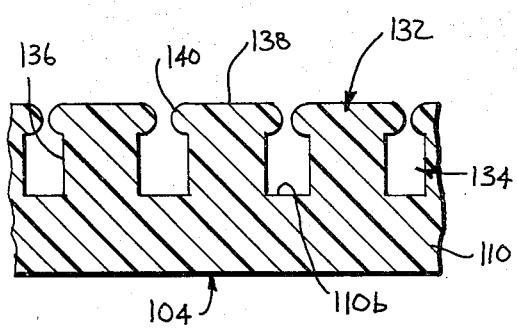
FIG. 4 is a cross-sectional view of some of the pedestals of FIG. 2.
Figure 5:
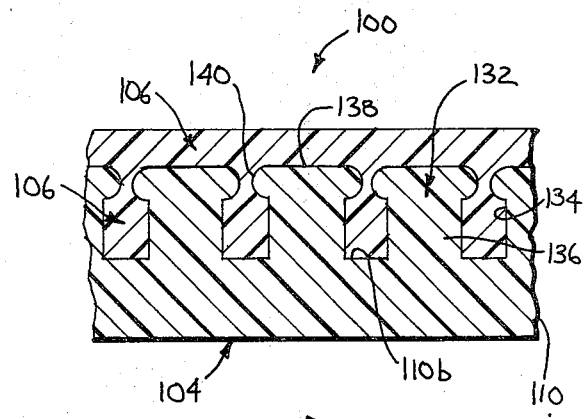
FIG. 5 is a cross-sectional view similar to FIG. 4, but showing the liner in interlocking engagement with the pedestals.

At station D (FIG. 9), a molten pellet 106 or globule of moldable liner-forming plastic, such as has been heated to about 300-325 degrees F. for about 3 to 4 seconds is deposited by metering device 240 into cap 104, until the liner-forming plastic overlies and covers mushroom-shaped overhangs 140 (FIG. 5). Liner-forming plastic 106 flows and fills liner-receiving passageways 134, between pedestals 132, and engages pedestals 132 and the underside 110b of cap-top 110.

At liner-forming station E (FIG. 9), a cam-actuated, liner-forming plunger assembly 242 is moved downward into cap 104 to moldably compress the liner-forming plastic 106 at a temperature which will not deform cap 104, such as at a temperature less than 150 degrees F. Plunger assembly 242 is held downward for a sufficient period of time so that the liner-forming plastic 106 will set under compression to form a resilient liner that fluidly seals against the finish of the container. In the illustrative embodiment, plunger assembly 242 has a liner-forming plunger 244 circumscribed by a movable spring-biased, cylindrical sleeve 246. Plunger 244 compresses the liner-forming plastic 106, while sleeve 246 engages the internal annular lip 116 and skirt 112 of cap 104 to prevent the liner-forming plastic from being molded to the skirt 112. The face of plunger 244 is shaped to form the central disc-shaped portion 106b (FIG. 1) and annular bead 106a or liner 106.

When EVA liner-forming plastic is used, the overhangs 140 of the mushroom-shaped pedestals 132 interlockingly engage and are fused to the liner-forming plastic 106. For liner-forming materials, such as PVC, which will not readily fuse to the polypropylene cap 104, the mushroom-shaped pedestals 132 will still provide a secure mechanical interlock and connection with the liner 106.

Advantageously, the resultant secure mechanical interconnection between cap 104 and liner 106 attributable to the holding strength of the crushed pedestals 132, permits the liner-forming plastic to be deposited and formed at stations D and E without heating the cap, or at least without heating the non-pedestal portions of the cap, to its melting and plastic deformation temperature, thereby minimizing distortion of the cap when the liner is formed.

After the liner 106 is molded, the liner-forming plunger assembly 242 is withdrawn. It will be appreciated by those skilled in the art that one or more of the above stations A-E can be combined, if desired.

At discharge station F, composite plastic closure 100 is guided to a discharge chute 248 where it is deposited in a collection receptacle or conveyed to other locations.

The composite plastic closures 100 are subsequently shipped to a bottler. At the bottling plant, the bottles are filled with the desired beverage or liquid, and conveyed on a rotatable drum or turret to stations G and H (FIG. 10).

At station G (FIG. 10), the composite plastic closures 10 are inserted and screwed onto the bottle 102.

At station H (FIG. 10), pilfer-band 128 of closure 100 is heat-shrunk around the bottleneck so that it returns to its inwardly biased position. In the embodiment shown in FIG. 10, the capped bottle 102 is conveyed through a heated oven 250 to heat-shrink pilfer-band 128. In some circumstances, it may be desirable to locally heat-shrink pilfer-band 128 such as by gas heat or electric radiant heat.

Referring now to FIGS. 6 and 7, the composite plastic closure 150 is identical to the composite closure 100 shown in FIG. 1, except that the pedestals 152 are in the form of fusible cylindrical pedestals and do not have an overhang. Each of the pedestals 152 (FIG. 7) has a generally planar or flat end 154 with a circular edge 156 that defines at least part of a fusible heat concentration zone, which becomes thermally fused to liner 106 (FIG. 6) when liner 106 is compression molded and heated in crown 104 at station E (FIG. 9). The shape and arrangement of the fusible pedestals 152 are such as to permit them to be heated to its melting and plastic deformation temperature for fusion to the liner 106, while the other portions of cap 104 are kept cooler, thereby minimizing distortion of the cap when the liner is formed.

The process for making the composite plastic closure 150 with fusible cylindrical pedestals 152 is substantially similar to the process described above in the schematic flow diagrams of FIGS. 9 and 10, except that the liner-forming plastic 106 is fused to pedestals 132 at station E at a temperature range from about 150-250 degrees F. and station C is omitted because there is no need to crush the free ends 138 of pedestals 152. As shown in FIGS. 9 and 20, at station A wire mesh screen 220 having circular openings or apertures is secured to the face of cap-forming plunger 218 to form cylindrical pedestals 152. Alternatively, cylindrical pedestals 152 can be formed with a plunger 218 having a multitude of sockets or holes drilled therein.

Referring now to FIG. 8, the composite plastic closure 160 shown in FIG. 8 is identical to the composite closure 150 shown in FIGS. 6 and 7, except that the fusible pedestals 162 are pyramid-shaped and the bases 164 of the pyramids 162 in each lateral row 166 are contiguous. The apex or peak 168 of each pyramid 162 and the portions immediately adjacent thereto provides a fusible heat concentration zone 170 that becomes thermally fused to the molten liner-forming plastic as the liner is compression molded and heated in the cap at station E (FIG. 9). The fusible pyramid-shaped pedestals 162 also permit the pedestals to be heated to their melting and plastic deformation temperature for fusion to the liner 106, while the other portions of the cap 104 are kept cooler, so as to minimize distortion of the cap 104 when the liner is formed. Because of the shape arrangement and high heat transfer capabilities of the pyramid-shaped pedestals 162, it is believed that a cap with pyramid-shaped pedestals 162 can be kept even cooler than a cap with cylindrical pedestals 152, when the liner is formed.

The process for making the composite plastic closure 160 with the fusible pyramid-shaped, liner-engaging pedestals 162 is substantially identical to the process for making the composite closure 150 with fusible cylindrical pedestals 152, except that the face 252 of cap and pedestal-forming plunger 210 at station A (FIGS. 9 and 21) is serrated to form the pyramids 162. Preferably, the underside 110b of crown-top 110 is preheated to about 150 degrees F. at crown-lining station E.

It was found that pyramids with an apex of approximately 0.002 inch had about the same adhesion (thermal connection strength) with a liner as 0.013 inch diameter cylindrical pedestals formed with a 50 mesh stainless steel screen. Prior art closures provided only about one-fifth the adhesion (holding strength) of the pyramids and cylinders.

It will be appreciated by those skilled in the art that pedestals having other configurations could be made in accordance with the process of the subject invention.

Some of the many advantages of the process of the subject invention is the availability of using high modulus materials for the cap-skirt, because it is not necessary with the process of the subject invention for the skirt to be unduly flexible to enable the cap to be deflected when removed from the cap-forming plunger as it is in some prior art processes, inasmuch as removal of the cap from the cap-forming plunger in the subject process can be accomplished by an unthreading action. The cap can also be removed by a "pop off" action for economy of manufacture. It can be appreciated that in prior art processes once the thickness of the plastic skirt exceeded a certain amount it could not be readily removed from the die because the hoop stress and rigidity of the plastic skirt would be such as to prevent ready expansion of the skirt and axial ejection of the cap. This is avoided in the novel process of the subject invention.

Furthermore, by utilizing the process of the present invention, the wall thickness of the skirt can be made thinner than prior art closures, if desired, to have a greater range of internal thread height and profile, because the threads need not be tapered as in prior art closures to permit expansion of the skirt in order to remove the cap from the cap-forming plunger. The subject process, therefore, permits threads to be formed without a taper, if desired, for greater holding power.

While the novel process of the subject invention is particularly advantageous for lining thermoplastic liners in plastic caps, the process could be used with liners and caps of other material.

Although embodiments of the subject invention have been shown and described, it is to be understood that various modifications and substitutions can be made by those skilled in the art without departing from the novel spirit and scope of this invention.

What is claimed:

1. A process of making a composite closure for a container, comprising the steps of:
    forming a plastic cap having a top wall portion with a depending annular skirt and a plurality of plastic liner-engaging pedestals integrally extending from said top wall portion in the direction of said skirt, each of said plastic liner-engaging pedestals being spaced from each other to define liner-receiving passageways therebetween, said plastic liner-engaging pedestals including a series of pedestals extending generally across said top wall portion of said cap;
    depositing molten liner-forming plastic into said liner-receiving passageways of said plastic cap;
    compression molding said liner-forming plastic against said plastic liner-engaging pedestals and said top wall portion of said cap so that said liner-forming plastic flows upon and engages said pedestals and said top wall portion of said cap to form a plastic liner in said plastic cap.

2. A process for making a composite closure in accordance with claim 1 wherein said plastic liner engaging pedestals of said cap are formed with free ends spaced from said top wall portion of said cap and said process includes the step of upsetting said free ends of said pedestals to form an overhang for interlockingly engaging said liner-forming plastic.

3. A process for making a composite closure in accordance with claim 2 wherein said step of upsetting includes compressing the free ends of said pedestals.

4. A process for making a composite closure in accordance with claim 2 wherein said step of upsetting includes heating said free ends of said pedestals.

5. A process for making a composite closure in accordance with claim 2 including selectively controlling the liner-holding strength of said pedestals by upsetting said pedestals at a selected pressure and temperature.

6. A process for making a composite closure in accordance with claim 2 wherein said free ends of said pedestals are upset to form a mushroom-shaped overhang.

7. A process for making a composite closure in accordance with claim 1 wherein said plastic cap is formed with at least some fusible liner-engaging pedestals having a heat concentration zone, and said process includes fusing said liner-forming plastic to a portion of said liner-engaging pedestals adjacent said heat concentration zone while said liner-forming plastic is being compressed.

8. A process for making a composite closure in accordance with claim 7 wherein said fusible pedestals are each formed with a cylindrical configuration having a circular edge that defines at least part of said heat concentration zone.

9. A process for making a composite closure in accordance with claim 7 wherein said fusible pedestals are each formed with an apex defining at least part of said heat concentration zone.

10. A process for making a composite closure in accordance with claim 9 wherein said fusible pedestals are each formed with a pyramid configuration.

11. A process for making a composite closure in accordance with claim 1, wherein said step of forming said cap and said pedestals includes forming said pedestals such that the pedestals are essentially uniformly distributed across said top wall portion of said cap.

12. A process for making a composite closure in accordance with claim 11, wherein said step of forming said cap and said pedestals includes forming said pedestals such that the pedestals are arranged in a grid-like array across said top wall portion of said cap.

13. A process for making a composite closure in accordance with claim 1 wherein said cap is formed including an upstanding annular lip against which said liner-forming plastic is compression molded.

14. A process for making a composite closure in accordance with claim 13, wherein said annular lip is formed to retain said liner in said plastic cap.

15. A process of making a composite closure for a container comprising the steps of:
forming a plastic cap including a top wall portion, an annular skirt portion, an inwardly extending annular liner-retaining lip, and liner retention means integral with the top wall portion;
placing a predetermined amount of moldable plastic in said cap; and
forming a liner with said moldable plastic so that said moldable plastic flows against said lip and said lip retains said liner within said cap.

16. A process of making a composite closure as recited in claim 15, wherein said liner retention means includes a plurality of pedestals disposed in upstanding relation to said top wall portion.

17. A process of making a composite closure as recited in claim 16, wherein said pedestals are arranged in a grid-like array on said top wall portion.

18. A process of making a composite closure as recited in claim 16, wherein said pedestals comprise pyramids.

19. A process of making a composite closure as recited in claim 15, including the step of fusing said moldable plastic to said cap for retention of said liner within said cap.

20. A process of making a composite closure as recited in claim 15 wherein said annular lip is formed in angular relation to said top wall portion of said cap.

21. A process of making a composite closure as recited in claim 15 wherein said liner is formed to include an annular bead portion disposed in abutting relation to said annular lip.

22. A process of making a composite closure as recited in claim 21 wherein said annular bead portion is substantially thicker than the remaining portion of said liner.

23. A process of making a composite closure as recited in claim 21 wherein said annular bead portion is formed to include an inwardly disposed surface adapted to sealingly contact said container.

24. A process for making a composite closure as recited in claim 23 wherein said inwardly disposed surface of said annular bead is formed in a frusto-conical configuration.

25. A process for making a composite closure for a container, comprising the steps of:
forming a cap having a top wall portion, an annular skirt, a plurality of liner-engaging pedestals extending from said top wall portion in the direction of said skirt, including spacing portions of said liner-engaging pedestals from each other to define liner-receiving passageways therebetween, and a continuous annular liner-retaining lip;
depositing molten liner-forming material in said liner-receiving passageways of said cap; and
connecting said liner-forming material to said liner-engaging pedestals of said cap to form a liner in said cap.

26. A process for making a composite closure in accordance with claim 25 including compressing said liner-forming material in said liner-receiving passageways and allowing said compressed liner-forming material to set.

27. A process for making a composite closure in accordance with claim 25 including the step of upsetting at least some of said pedestals to form an overhang, and wherein said connecting step includes interlockingly connecting said liner to said upset pedestals.

28. A process for making a composite closure in accordance with claim 27 wherein said pedestals are upset to form a mushroom-shaped overhang.

29. A process for making a composite closure in accordance with claim 25 wherein:
said cap is formed with at least some fusible liner-engaging pedestals having a heat concentration zone, and
said connecting step includes thermally fusing said fusible pedestals to said liner.

30. A process for making a composite closure in accordance with claim 29 wherein said fusible pedestals are each formed with a cylindrical configuration having a circular edge that defines at least part of said heat concentration zone.

31. A process for making a composite closure in accordance with claim 29 wherein said fusible pedestals are each formed with an apex defining at least part of said heat-concentration zone.

32. A process for making a composite closure in accordance with claim 31 wherein said fusible pedestals are each formed with a pyramid configuration.

33. A process for making a composite closure in accordance with claim 25 wherein said liner forming material is fused to said pedestals.

34. A process for making a composite closure for a container, comprising the steps of:
filling a cap-shaped cavity in a die with molten moldable thermoplastic;
compressing the filled cavity with a cap-forming plunger having external threads and a pedestal-forming plunger-head to form a cap having a top wall portion, an internally threaded annular skirt and a grid-like array of liner-engaging pedestals extending from said top wall portion in the direction of said skirt, each of said pedestals having a free end and said free ends of said pedestals being spaced from each other to define liner-receiving passageways therebetween;
removing said cap from said plunger;
depositing molten fusible liner-forming plastic in said plastic cap;
compressing said fusible liner-forming plastic in said cap with a liner-forming plunger for a sufficient period of time so that said fusible liner-forming plastic flows upon, engages and fuses to said liner-engaging pedestals and said top wall portion while preventing said liner-forming plastic from contacting said internally threaded skirt to form a plastic liner in said plastic cap; and
removing said liner-forming plunger from said cap.

35. A process for making a composite closure in accordance with claim 34 wherein said plastic cap is formed with fusible cylindrical pedestals and said cylindrical pedestals are fused to said liner-forming plastic.

36. A process for making a composite closure in accordance with claim 34 wherein said plastic cap is formed with fusible pyramid-shaped pedestals and said pyramid-shaped pedestals are fused to said liner-forming plastic.

37. A process for making a composite closure in accordance with claim 34, including the steps of:
providing a movable intermediate sleeve and a movable outer ring to cooperate with said cap-forming plunger;

moving said intermediate sleeve into said filled cavity in cooperation with said cap-forming plunger to form an inwardly biased pilfer band having a minimum inside diameter less than the inside diameter of said skirt;

stripping said cap from said cap-forming plunger with said outer ring;

withdrawing said intermediate sleeve before said cap is completely stripped from said cap-forming plunger;

providing a stretcher and a scoring device with a shearing edge;

stretching said pilfer band with said stretcher to a minimum inside diameter at least as great as the inside diameter of said threaded skirt to enable said plastic cap to be inserted and screwed onto said container;

scoring said pilfer band while said band is stretched to form frangible bridges detachably connecting said pilfer band to said skirt; and heat shrinking said pilfer band about the neck of said container after the composite closure has been inserted and screwed onto said container.

38. A process of making a composite closure for a container, comprising the steps of:
forming a plastic cap with a top wall portion and an annular skirt;
forming a plurality of plastic pedestals extending integrally from said top wall portion generally in the direction of said skirt, and a continuous liner-retaining annular lip;
positioning said pedestals in spacial relationship to each other to define a plurality of liner-receiving passageways;
placing a predetermined amount of moldable plastic in said plastic cap; and
forming a liner with said moldable plastic in said liner-receiving passageways to form a composite closure.

39. A process of making a composite closure in accordance with claim 38 wherein said liner and said pedestals are fused to each other.

40. A process of making a composite closure in accordance with claim 38 wherein said liner and said pedestals are interlockingly engaged to each other.

41. A process of making a composite closure in accordance with claim 38 wherein said moldable plastic is compression molded to said pedestals.

42. A process of making a composite closure in accordance with claim 38 wherein said cap is spun about its axis while molten for forming spirally orientated plastic molecules in said cap to enhance the strength of said cap.

43. A process for making a composite closure for a container comprising the steps of:
forming a plastic cap with a top wall portion and an annular skirt;
forming a plurality of plastic pedestals integrally with said top wall portion wherein said pedestals are distributed substantially evenly across said top wall portion and define liner-receiving passageways therebetween;
forming an upstanding annular lip in said cap in spaced relation to said pedestals;
placing liner-forming plastic into said cap; and
compressing said liner-forming plastic to flow into said passageways and against said annular lip to form a liner.

44. A process for making a composite closure as recited in claim 43, and
upsetting free end portions of said pedestals before placing said liner-forming plastic in said cap.

45. A process for making a composite closure as recited in claim 43, wherein said annular lip is formed to define a retainer engaging annular portions of said liner for retaining said liner within said cap.

46. A process for making a composite closure as recited in claim 43 wherein said pedestals are formed in a grid-like array for enhancing retention of said liner within said cap.

47. A process for making a composite closure as recited in claim 46 wherein said liner-forming plastic is fused to a portion of said pedestals for retaining said liner within said cap.

48. A process for making a composite closure as recited in claim 46 wherein said liner-forming plastic is mechanically connected to said pedestals.

49. A process for making a composite closure as recited in claim 46 wherein said liner-forming plastic is mechanically connected to said pedestals by deforming the pedestals to form overhanging portions before placing the liner-forming plastic in said cap.

50. An apparatus for making a composite closure for a container, comprising:
means for forming a plastic cap with a top wall portion and an annular skirt;
means for forming a plurality of plastic pedestals extending integrally from said top wall portion generally in the direction of said skirt and for positioning said pedestals in spaced relationship to each other to define a plurality of liner-receiving passageways;
means for placing a predetermined amount of moldable plastic in said plastic cap; and
means for forming a liner with said moldable plastic in said liner-receiving passageways to form a composite closure.

51. An apparatus in accordance with claim 50 wherein said liner-forming means includes means for fusing said liner and pedestals to each other.

52. An apparatus in accordance with claim 50 including means to interlockingly engage said pedestals to said liner.

53. An apparatus in accordance with claim 50 including means for forming an annular liner-retaining lip to define an annular retention area for said liner.

54. An apparatus in accordance with claim 50 including means for spinning said plastic cap about its axis while molten to enhance the strength of said cap.

55. An apparatus in accordance with claim 50 including means for forming a pilfer band depending from said skirt, means for stretching said pilfer band, and means for scoring said pilfer band.

56. A process of making a composite closure in accordance with claim 15, including:
forming said plastic cap by filling a cavity in a die with moldable thermoplastic and compressing the thermoplastic with a cap-forming plunger;
providing an intermediate sleeve and an outer ring to cooperate with said cap-forming plunger;
moving said intermediate sleeve into said cavity in cooperation with said cap-forming plunger to form an inwardly biased pilfer band having a minimum inside diameter less than the inside diameter of said skirt;

withdrawing said intermediate sleeve from the inwardly biased pilfer band formed; stripping said cap from said cap-forming plunger with said outer ring;

stretching said pilfer band to a minimum inside diameter at least as great as the inside diameter of said skirt; and scoring said pilfer band to form frangible bridges detachably connecting said pilfer band to said skirt.

* * * * *